United States Patent [19]

Bardenheuer

[11] Patent Number: 4,661,317
[45] Date of Patent: Apr. 28, 1987

[54] METHOD FOR MANUFACTURING A HYDROGEN-STORING ALLOY

[75] Inventor: Friedrich Bardenheuer, Krefeld, Fed. Rep. of Germany

[73] Assignee: Mannesmann Aktiengesellschaft, Duesseldorf, Fed. Rep. of Germany

[21] Appl. No.: 767,660

[22] Filed: Aug. 21, 1985

Related U.S. Application Data

[63] Continuation-in-part of Ser. No. 747,282, Jun. 21, 1985, abandoned.

[30] Foreign Application Priority Data

Jun. 28, 1984 [DE] Fed. Rep. of Germany ....... 3424341
Jun. 8, 1985 [EP] European Pat. Off. ... EP85730075.0
Aug. 7, 1985 [EP] European Pat. Off. ... EP85730105.5

[51] Int. Cl.$^4$ .................. C22C 1/06; C22C 22/00
[52] U.S. Cl. .................. 420/434; 420/590; 420/900
[58] Field of Search .................. 420/900, 590, 434; 423/644, 648 R; 75/10 R, 129

[56] References Cited

U.S. PATENT DOCUMENTS 2,926,981  3/1960  Stout .................. 316/25
4,079,523  3/1978  Sandrock .................. 34/15

FOREIGN PATENT DOCUMENTS 3023770  11/1983  Fed. Rep. of Germany ...... 420/900
5831  1/1982  Japan .................. 420/900
41337  3/1982  Japan .................. 420/900

OTHER PUBLICATIONS

Sandrock et al, "Metallurgical Considerations in the Production and Use of FeT. Alloys for Hydrogen Storage", Proc 11th Intersociety Energy Conversion, Engineering Conference AICHE 965 (1976).
Making Shaping & Treating of Steel, 9th ed., pp. 591–592 ©1983.

Primary Examiner—Christopher W. Brody
Attorney, Agent, or Firm—Oblon, Fisher, Spivak, McClelland, & Maier

[57] ABSTRACT

The invention relates to a method of manufacturing a hydrogen-storing alloy based on the Laves phases $AB_2$, where A is titanium and/or zirconium, and B is one or more elements from the remainder of the transition metal series, wherewith the ratio of the atomic radii of A and B, $r_A/r_B$, is between 1.05 and 1.68. This is run by melting in vacuum or under a protective gas.

In order to achieve hydrogen storing capacity, it is provided according to the invention: that the melting is carried out in a heating apparatus with a vessel lined with an oxide or oxides of one or more metals having a strong affinity for oxygen; further, that in a first step a partial alloy is produced comprising the selected elements with the exception of titanium, zirconium, and cerium, if cerium is to be an alloy element; that in a second step the partial alloy is deoxidized with titanium and/or zirconium and/or aluminum added in an amount that corresponds to the quantity of oxygen introduced with the alloy elements, and after, in a rest period, the oxide particles created by the deoxidation are deposited as completely as possible in the slag; that in a third step, the remainder of the prescribed amount of the titanium and/or zirconium is added to the melt; and, cerium, if it is to be used, is added only after deoxidation, and then the melt is abruptly cooled.

18 Claims, No Drawings

METHOD FOR MANUFACTURING A HYDROGEN-STORING ALLOY

This application is a continuation-in-part of Ser. No. 747,282, filed June 21, 1985 now abandoned.

BACKGROUND OF THE INVENTION

1. Field of the Invention

The invention relates to a method of manufacturing a hydrogen-storing alloy based on the Laves phases AB2, where A is titanium and/or zirconium, and B is one or more elements from the remaining transition metal series.

2. Discussion of the Background

These hydrogen-storing alloys are composed of intermetallic phases, i.e., chemical compounds of the base components out of which these alloys are made. The stoichiometric ratio of the components are represented adequately by the formula AB2, where A is an element at or near the beginning of the transition metal series, and B represents one or more elements from the remainder of the transition metal series. A condition which must be satisfied by A and B is that the ratio of the atomic radii, $r_A/r_B$, is between 1.05 and 1.68. Such compounds crystallize in the so-called C14 structure, which is distinguished by an especially dense packing of the atoms. The C14, C15, and C36 structures are designated "Laves phase" structures (for intermetallic compounds). The elementary (unit) cell of the C14 structure is hexagonal, having 4 A-atoms and 8 B-atoms. The density of these metallic, very brittle compounds is about 6 g/cm$^3$.

Numerous examples of such alloys are known from the literature. In addition to titanium and manganese they may be comprised of, preferably, zirconium, chromium, vanadium, iron, cobalt, nickel, copper, and aluminum (in the appropriate combinations). Their "hydrogen storing capacity" is >2 wt. %. (The hydrogen storing capacity is defined as the difference in weight between the hydrogen uptake at room temperature with hydrogen pressure 50 bar and the hydrogen content at 60° C. with a hydrogen pressure of 1 bar, divided by the weight of the storing material.) German OS 30 23 77 discloses examples of such hydrogen-storing alloys, and a method for the molten metallurgical preparation of these alloys i.e., by smelting. In this method, the powdered components of the alloy are mixed together roughly, and then quickly melted in the water-cooled copper crucible of an arc furnace, under vacuum or under a protective gas. The alloy is solidified, comminuted, and remelted in vacuum or under a protective gas, to achieve increased uniformity. These operations may be repeated a number of times.

In order to further improve uniformity, multiple annealing of the hydrogen-storing alloy at 1000° C., under vacuum under a protective gas, has been proposed.

A disadvantage of this known process is that, as a rule, it generally leaves a considerable proportion of oxygen and oxides in the hydrogen-storing alloy. These appreciably reduce storing capacity. Further, it is very costly in terms of labor and energy to manufacture the alloy by repeated melting, cooling, and comminuting, in addition to (possibly) heat treating. Finally, the melting is often accompanied by reactions between the melt and the crucible material, to counteract this, crucible-free melting methods have been proposed, but these are costly.

Accordingly, there is a strongly felt need for a more facile method for the preparation of these alloys. And, ideally, this more facile method should also provide hydrogen-storing alloys with increased hydrogen storing capacity, and not suffer the drawbacks associated with reactions between the melt and the crucible material.

SUMMARY OF THE INVENTION

Accordingly, an object of this invention is to provide a novel method for manufacturing hydrogen-storing alloys based on the Laves phases AB$_2$, where A is titanium and/or zirconium and B is one or more elements chosen from the remaining transition metals.

It is another object of this invention to provide a novel method for manufacturing hydrogen-storing alloys having maximal storing capacity.

It is another object of this invention to provide a novel, facile method for manufacturing hydrogen-storing alloys.

It is another object of this invention to provide a novel method for manufacturing hydrogen-storing alloys, where the method does not suffer the drawbacks associated with reaction between the melt and the crucible material.

It is another object of this invention to provide a novel, facile method for manufacturing hydrogenstoring alloys having maximum storing capacity and where the method does not suffer the drawbacks associated with reaction between the melt and the crucible material.

It is another object of this invention to provide a novel hydrogen storing alloy meeting all of the above objects of this invention.

Applicants have surprisingly discovered that all of the above objects of this invention are satisfied with a method for manufacturing a hydrogen-storing alloy based on the Laves phases AB$_2$, where A is titanium and/or zirconium, and B is one or more element from the remainder of the transition metal series, where the ratio of the atomic radii of A and B, $r_A/r_B$, is between 1.05 and 1.68. This method is characterized by melting, under vacuum and/or under a protective gas. The melting, which should preferably take place at a high temperature, is done in a vessel which is lined with a lining composed of the oxide or oxides of one or more metals having a strong affinity for oxygen. In the first step of the method, a partial alloy is produced comprising the selected elements with the exception of titanium, zirconium, and, if cerium is to be an alloy element, without cerium. In a second step, the partial alloy is deoxidized with titanium and/or zirconium and/or aluminum added in an amount that corresponds to the quantity of oxygen introduced with the alloy elements. And, after in a rest period, the oxide particles created by the deoxidation are deposited as completely as possible in the slag. In a third step, the remainder of the prescribed amount of the titanium and/or zirconium is added to the melt. And, cerium, if it is to be used, is added only after deoxidation, and then the melt is abruptly cooled.

The present invention also provides a novel hydrogen storing alloy made in accordance with the above method.

DETAILED DESCRIPTION OF THE PREFERRED EMBODIMENTS

The present invention thus relates to a method of manufacturing a hydrogen-storing alloy based on the Laves phases AB$_2$, where A is titanium and/or zirconium, and B is one or more element from the remainder of the transition metal series, where the ratio of the atomic radii of A and B, $r_A/r_B$, is between 1.05 and 1.68. This method is characterized by melting, under vacuum and/or under a protective gas. The melting, which should preferably take place at a high temperature, is done in a vessel which is lined with a lining compound of the oxide or oxides of one or more metals having a strong affinity for oxygen. In the first step of this method, a partial alloy is produced comprising the selected elements with the exception of titanium, zirconium, and if cerium is to be an alloy element, without cerium. In a second step, the partial alloy is deoxidized with titanium and/or zirconium and/or aluminum added in an amount that corresponds to the quantity of oxygen introduced with the alloy elements. And, after, in a rest period, the oxide particles created by the deoxidation are deposited as completely as possible in the slag. In a third step, the remainder of the prescribed amount of the titanium and/or zirconium is added to the melt. And, cerium, if it is to be used, is added only after deoxidation, and then the melt is abruptly cooled.

The cerium may be added to the melt as the final alloying component.

The deoxidation of the melt may take place in several partial steps, in which more than half of the planned quantity of the deoxidizing agent is added in the first partial step.

The rest period after the addition of the deoxidizing agent preferably, should numerically equal or exceed, in terms of minutes, the value in terms of centimeters of the height of the batch glass level of the melt. The melt may also be rested after the addition of the remaining quantity of titanium and/or zirconium for an additional rest period, the length of which may be in terms of minutes, numerically at least equal to the value in terms of centimeters of the bath glass level of the melt.

The remaining quantity of titanium and/or zirconium may, preferably, be added in at least two partial batches. In this embodiment, the melt is rested after the addition of each partial bath for a time in terms of minutes that is at least equal to the value in terms of centimeters of the bath glass height of the melt.

Calcium oxide (CaO), cerium oxide (Ce$_2$O$_3$), zirconium oxide (ZrO$_2$) or aluminum oxide (Al$_2$O$_3$) may each be used as the vessel lining.

The cooling may take place in a liquid-cooled metal chill form, which may preferably be a watercooled steel or copper chill form.

The chill form used for cooling may have an inner surface in terms of cm$^2$, which numerically may be at least 40-times, preferably 60 times, the value in terms of kilograms of the melt weight.

It is also possible, of course, to melt individual alloy constituents together first into preliminary alloys.

In another preferred embodiment, the method is characterized in that the holding time (at temperature) after the addition of the deoxidation agent is at least 20 min.

In another preferred embodiment, the method is characterized in that, prior to the deoxidation step, the melt is held at least 20 min at a temperature of 1200° to 1600° C. or higher, preferably 1350° to 1450° C., most preferably about 1400° C.

In another preferred embodiment, the method is characterized in that, after the step in which the remainder of the titanium and/or zirconium is added, the melt is held (at temperature) for at least 20 min.

In another preferred embodiment, the method is characterized in that the remainder of the titanium and/or zirconium is added in at least two portions, and after the addition of each such portion the melt is held (at temperature) for about 20 min.

In another preferred embodiment, the method is characterized in that the cooling is carried out in a water-cooled mold comprised of steel or copper material.

The starting point of the invention is that the hydrogen-storing alloy is manufactured in a melting apparatus, e.g. an induction furnace preferably in a single melting operation, carried out under a vacuum and/or under a protective gas. It is also possible, of course, to melt individual alloy constituents together first into preliminary alloys. In order to prevent reactions of the melt with the crucible material, the invention provides that the melting be carried out in a vessel lined with metals having a strong affinity for oxygen, such as calcium, serium, aluminum or zirconium, in particular. A benefit of this is that the melt can be kept molten over a relatively long time without hazard to the vessel, and without large energy losses due to crucible cooling. The choice of a lime lining, moreover, avoids reduction of the vessel lining (which would result in addition of oxygen to the melt, despite the presence of the protective gas or vacuum).

The first step of the inventive method is to produce a partial alloy in the melt, using the constituent elements of the desired hydrogen-storing alloy with the exception of the prescribed amounts of titanium and/or zirconium and (if any) of cerium. Preferably, this partial alloy is held at least 20 min at about 1400° C., to achieve a uniform intermixing of the components and separation out of any oxide components which may have been introduced with the added components.

In a second step, this partial alloy is deoxidized by the addition of titanium and/or zirconium in an amount of 0.1–0.2 wt. % of the weight of the melt. This is accompanied by removal and separation out of any oxygenated materials still in solution. The titanium and/or zirconium are added in these small amounts, rather than in the entire amount prescribed, to act as deoxidizing agents, which form relatively large oxide particles which rise rapidly into the slag and are thereby separated out. Fine oxide particles, in contrast, would remain in the melt. In order to achieve adequate separation, the melt must be kept at temperature for at least 10 min, and preferably 20 min, after addition of the deoxidizing agents.

Then, the remainder of the prescribed amount of titanium and/or zirconium is added, in a third step. It is also advantageous to hold the melt at temperature for at least 20 min after this addition. According to a particularly preferred embodiment, the said remainder of the titanium and/or zirconium is added in at least two portions, with a holding time (at temperature) of at least 20 min after each such addition. This promotes uniform composition and deoxidation of the melt.

In a fourth step (in a refinement of the invention), the final element cerium (generally as cerium misch metal), is added to the melt, in order to bind any remaining oxygen component in the melt. Some of the cerium is added preliminarily, in order to preferably bind the oxygen present in the melt to the cerium, which has the highest affinity for oxygen of any of the componends present in the melt. In this way, already-formed titanium and/or zirconium oxides may be re-reduced.

Cerium oxide has the disadvantage over titanium and/or zirconium oxide that it is denser (density ca. 7 g/cm$^3$), and therefore more readily remains in suspension, to pervade the hydrogen-storing alloy mass as a detrimental oxide.

In the final step, the molten hydrogen-storing alloy is abruptly cooled, while continuing to shield it from the surrounding air. Preferably, a water-cooled steel or copper mold is employed for this cooling.

Other features of the invention will become apparent in the course of the following description of exemplary embodiments which are given for illustration of the invention and are not intended to be limiting thereof.

EXAMPLE 1

A hydrogen-storing alloy with the following composition was desired:

$$Ti_{1.0}V_{0.4}Fe_{0.07}Cr_{0.05}Mn_{1.5}$$

Based on calculations of atomic weights and an expected vapor loss of Mn in an amount of 7.5%, the following formulation was provided for a melt of about 30 kg: Ti=8.86 kg; V=3.74 kg; Fe=0.71 kg; Cr=0.48 kg; Mn=16.27 kg; and Ce (misch metal)=0.40 kg.

In the first step, the prescribed amounts of Fe, Cr, Mn, and V were melted together at 1400° C. in an induction furnace with a CaO lining, under a protective gas. The resulting partial alloy was then deoxidized with 60 g of titanium. After a waiting time of 20 min, the remainder of the prescribed amount of titanium was added. After an additional 20 min, the prescribed amount of Ce misch metal was added.

Finally, the melt, still under a protective gas, was poured at 1380° C. into a water-cooled steel mold and cooled to room temperature. The hydrogen-storing alloy produced had an oxygen content of <0.001 wt. %.

EXAMPLE 2

A hydrogen-storing alloy comprised of Ti, Zr, Fe, Mn, V, and Ce was desired. In the first step, the prescribed amounts of Mn, V, and ferrovanadium were melted together at 1400° C. in an induction furnace with a CaO lining, under argon, similarly to Example 1. The melt was held for 30 min at this temperature and then deoxidized with 0.2 wt. % titanium, which was followed by another 30 min holding period. Then about half the prescribed amount of titanium was added, and the melt was held at temperature for 10 min. Next, the remainder of the prescribed amount of the titanium, and the zirconium, were added, and the melt was held at temperature for an additional 30 min. Finally, the prescribed amount of the cerium misch metal was added to the melt, and the resulting melt was tapped at 1380° C. into a water-cooled mold, where it was cooled.

Again the oxygen content of the alloy was <0.001 wt. %.

In the least favorable case at 0° C., the usable hydrogen storing capacity of the alloy was 1.95 wt. % (based on the weight of the alloy), for a loading pressure of 50 bar and an unloading pressure of 1–2 bar of hydrogen.

Obviously, numerous modifications and variations of the present invention are possible in light of the above teachings. It is therefore to be understood that within the scope of the present claims, the invention may be practiced otherwise than as specifically described herein.

What is claimed as new and desired to be secured by letters patent of the United States is:

1. A method for manufacturing a hydrogen-storing alloy based on the Laves phase $AB_2$, by melting in a vacuum or under a protective gas, wherein A is titanium or zirconium, and B is one or more elements from the remainder of the transition metal series, wherein the ratio of the atomic radii or A and B, $r_A/r_B$, is between 1.05 and 1.68, and wherein the said melting is done in a vessel lined with a lining composed of the oxide or oxides of one or more metals having a strong affinity for oxygen; said method comprising:
   a first step, in which, a partial alloy is produced from the selected elements with the exception of titanium, or zirconium, and, if cerium is to be an alloy element, without cerium;
   a second step, in which, the partial alloy is deoxidized with titanium, zirconium or aluminum added in a quantity that corresponds to the quantity of oxygen introduced with the alloy elements, said second step being followed by a rest period in which the oxide particles created by the deoxidation are deposited as completely as possible in the slag; and
   a third step, in which, the remaining quantity of titanium or zirconium is added to the melt, and wherein cerium, if it is to be used, is added only after deoxidation, and then the melt is abruptly cooled.

2. The method of claim 1, wherein the said melting takes place at a high temperature.

3. The process of claim 1, wherein cerium is added to the melt as the last alloy constituent.

4. The process of claim 1, wherein the deoxidation of the melt takes place in several partial steps, wherein more than half of the planned quantity of the deoxidizing agent is added in the first partial step.

5. The process of claim 1, wherein the rest period after the addition of the deoxidizing agent has a length in terms of minutes which equals or exceed the value in terms of centimeter of the height of the bath glass level of the melt.

6. The process of claim 1, wherein the melt is rested after the addition of the remaining quantity of titanium or zirconium for an additional rest period, the length of which in terms of minutes equals or exceeds the value in terms of centimeter of the bath glass level of the melt.

7. The process of claim 1, wherein the remaining quantity of titanium or zirconium is added in at least two partial batches, and the melt is rested after the addition of each partial batch for a time in terms of minutes that is equal to or exceeds the value in terms of centimeters the bath glass height of the melt.

8. The process of claim 1, wherein calcium oxide is used for the said lining.

9. The process of claim 1, wherein cerium oxide is used for the said lining.

10. The process of claim 1, wherein zirconium oxide is used for the said lining.

11. The process of claim 1, wherein aluminum oxide is used for the said lining.

12. The process of claim 1, wherein the said cooling takes place in a liquid-cooled metal chill form.

13. The process of claim 12, wherein the cooling takes place in a water-cooled steel or copper chill form.

14. The process of claim 1, wherein a chill form is used for cooling, wherein the said chill form has an inner surface, in terms of cm², which is at least 40 times the value in terms of kilogram of the melt weight.

15. The process of claim 14, wherein the inner surface is at least 60-times the melt weight.

16. A hydrogen-storing alloy based on the Laves phase AB₂, wherein A is titanium or zirconium, and B is one or more elements from the remainder of the transition metal series, wherein the ratio of the atomic radii of A and B, $r_A/r_B$, is between 1.05 and 1.68, said alloy being obtained by melting the components in a vacuum or under a protective gas in a vessel lined with a lining composed of the oxide or oxides of one or more metals having a strong affinity for oxygen; said alloy being obtained by:
  (i) producing a partial alloy from the elements of the alloy with the exception of titanium, or zirconium, and, if cerium is to be an alloy element, without cerium;
  (ii) deoxidizing the partial alloy obtained in step (i) with titanium, zirconium, or aluminum added in a quantity that corresponds to the quantity of oxygen introduced with the alloy elements, followed by a rest period in which the oxide particles created by the deoxidation are permitted to deposit as completely as possible in the slag; and
  (iii) adding the remaining quantity of titanium or zirconium to the melt, and wherein cerium, if it is to be used, is added only after deoxidation, and then the melt is abruptly cooled.

17. The hydrogen-storing alloy of claim 16, said alloy being obtained by adding cerium to the melt as the last alloy constituent.

18. The hydrogen-storing alloy of claim 16, said alloy being obtained by deoxidizing the melt in several partial steps, wherein more than half of the planned quantity of deoxidizing agent is added in the first partial step.

* * * * *